United States Patent
Gulian

(10) Patent No.: US 10,610,052 B2
(45) Date of Patent: Apr. 7, 2020

(54) GRILL

(71) Applicant: Clay Oven Co. Ltd., London (GB)

(72) Inventor: Shahai Gulian, London (GB)

(73) Assignee: Clay Oven Co. Ltd., London (GB)

( * ) Notice: Subject to any disclaimer, the term of this patent is extended or adjusted under 35 U.S.C. 154(b) by 184 days.

(21) Appl. No.: 15/818,003

(22) Filed: Nov. 20, 2017

(65) Prior Publication Data

US 2018/0070771 A1    Mar. 15, 2018

Related U.S. Application Data

(63) Continuation of application No. 13/303,737, filed on Nov. 23, 2011, now Pat. No. 9,839,322.

(30) Foreign Application Priority Data

Dec. 16, 2010   (GB) .................................. 1021437.7

(51) Int. Cl.
*A47J 37/07* (2006.01)

(52) U.S. Cl.
CPC ................................. *A47J 37/0713* (2013.01)

(58) Field of Classification Search
CPC .................................................. A47J 37/0713
USPC .............................................. 126/39 E, 25 R
See application file for complete search history.

(56) References Cited

U.S. PATENT DOCUMENTS

| 1,954,476 A * | 4/1934 | Gloekler ............. A47J 37/0682 126/41 R |
| 3,190,283 A * | 6/1965 | Miyahara ................ F24H 1/107 126/350.1 |
| 3,667,449 A | 6/1972 | Persinger et al. |
| 3,693,610 A | 9/1972 | Ehrlichmann |
| 3,757,765 A | 9/1973 | Yamada |
| 3,938,494 A | 2/1976 | Clark |
| 3,943,910 A | 3/1976 | White |
| 4,089,258 A | 5/1978 | Berger |
| 4,165,683 A | 8/1979 | Van Gilst |
| 4,541,407 A * | 9/1985 | Sommers ................ F23D 14/06 126/214 A |
| 4,553,524 A | 11/1985 | Wheat et al. |
| 4,593,676 A | 6/1986 | Wackerman |

(Continued)

FOREIGN PATENT DOCUMENTS

| GB | 2286111 | 8/1995 |
| GB | 2373713 | 10/2002 |

(Continued)

OTHER PUBLICATIONS

UK Search Report dated Feb. 17, 2011 in counterpart GB Application No. 1021437.7.

(Continued)

*Primary Examiner* — Avinash A Savani
(74) *Attorney, Agent, or Firm* — Andrus Intellectual Property Law, LLP

(57) ABSTRACT

A grill configured to cook food placed above it. The grill comprising a base having an interior and containing a support for the food being cooked and gas jets for burning gas and generating heat to cook the food. The gas jets are directed downwards towards the interior of the base, thereby heating a bed of heat absorbent inert material. This material is heated by the gas jets and then radiates heat upwardly in the direction towards the support.

18 Claims, 3 Drawing Sheets

(56) References Cited

U.S. PATENT DOCUMENTS

| | | | |
|---|---|---|---|
| 4,901,705 A | 2/1990 | Takata et al. | |
| 4,905,660 A | 3/1990 | Leduc et al. | |
| 4,944,283 A | 7/1990 | Tsuchiya et al. | |
| 5,421,319 A | 6/1995 | Moore et al. | |
| 5,603,255 A | 2/1997 | Nouvelot et al. | |
| 5,613,486 A | 3/1997 | Johnston | |
| 7,210,402 B2 | 5/2007 | Han et al. | |
| 2004/0123858 A1* | 7/2004 | McFadden | A21B 1/245 126/21 A |
| 2004/0134479 A1 | 7/2004 | Han et al. | |
| 2006/0180137 A1 | 8/2006 | McDonald | |
| 2006/0278210 A1* | 12/2006 | Wang | A47J 37/0635 126/25 R |
| 2010/0095951 A1 | 4/2010 | Ahmed | |
| 2010/0218691 A1 | 9/2010 | Adams et al. | |
| 2011/0049125 A1* | 3/2011 | Home | A47J 37/0709 219/405 |
| 2012/0160108 A1 | 6/2012 | Coutts | |
| 2013/0000629 A1 | 1/2013 | Christopoulos | |

FOREIGN PATENT DOCUMENTS

| | | |
|---|---|---|
| JP | 10-038229 | 2/1998 |
| JP | 2000217718 | 8/2000 |
| JP | 2003033281 | 2/2003 |
| JP | 2003047563 | 2/2003 |
| JP | 2005237465 | 9/2005 |

OTHER PUBLICATIONS

Yutaka Machine Translation; Accessed by Examiner on Apr. 26, 2016; Machine Translation of Japanese Reference JP 2000-217718 A; https://www4.j-platpat.inpit.go.jp/cgi-bin/tran_web_cgi_ejje?u= http://www4.j-platpat.inpit.go.jp/eng/translation/201604270151557 3626444495350119711B3ERA19805640D92E1DE7D316E753EF.

* cited by examiner

GRILL

CROSS-REFERENCE TO RELATED APPLICATION

The present application is a continuation of U.S. application Ser. No. 13/303,737 filed Nov. 23, 2011, which application published on Jun. 12, 2012 as U.S. 2012/0156349 in the English language, which application claims priority to and the benefit of British Patent Application No. 1021437.7, filed on Dec. 16, 2010, the disclosure of which is hereby incorporated in entirety herein by reference.

FIELD OF INVENTION

The present invention relates to a grill configured to cook food placed above it. More particularly, the invention relates to a gas grill that is arranged to reduce the risk of the gas jets becoming clogged and is suitable for use in commercial kitchens.

BACKGROUND

Grills configured to cook food placed above the heat source are well known. Such a grill is disclosed in GB 2373713 and includes a series of gas jets embedded in a bed of clay litag. The heat from the burning gas rises upwards through the bed of clay litag and so cooks the food located above it. The bed acts to diffuse the heat and does not itself absorb much heat energy. However, known grills may have a bed of heat-absorbing material, for example, lava stones that are heated by the burning gas to a temperature at which the lava stones themselves emit sufficient heat radiation to contribute significantly to the cooking of the food, that is to say, this radiation, in addition to hot gases from the heat source filtering up through the lava stones, cooks the food.

As food cooks on the grill, material such as fat and meat juices drip onto the lava stones or clay litag and also onto the gas jets, which can easy become clogged by the falling material. The material will tend to collect in the bottom of the grill where the heat source is located. To maintain proper operation and hygiene, it is necessary to regularly clean the grill in order to avoid build-up of material and prevent the gas jets from becoming clogged. Over time, it may not be possible to remove all of the material and this may lead to uneven heating by gas jets and consequently uneven cooking of food occurs. Eventually, it may even become necessary to replace the gas jets.

JP10038229 discloses an oven that contains sidewalls enclosing a substantially closed internal space. Within the sidewalls, a rack is provided for holding the food being cooked and, underneath the food, a number of burners are provided to heat the air inside the oven. The burners produce a flame that slants downwardly and include an overhang to prevent juices from the food being cooked falling on the burner nozzles. The flames heat the air in the oven but are not used to heat a solid incandescent radiant body.

JP 20030 47563 discloses a closed oven for cooking food. Burners are provided in compartments adjacent to the sidewalls. The direction of the flames produced by the burners can be adjusted using air drawn in through side vents so that the flame can be made to point upwards or downwards; the object of altering the direction of the flames is to make the heating more even. The flames heat the air in the oven but are not used to heat a solid incandescent radiant body.

JP 2003 033281 discloses a closed oven containing a number of burners for heating the interior of the oven. One set of burners directs flames into the space underneath the food being cooked and is located under a shield so that, if juices drip from the food being cooked, they do not fall on the burner. The flames heat the air in the oven but are not used to heat a solid incandescent radiant body.

JP 2005 237465 discloses a closed oven having burners located above the food being cooked and a further set of burners extending through a side wall of the oven and directing flames to a space underneath the food being cooked. The flames heat the air in the oven but are not used to heat a solid incandescent radiant body.

JP 2000 217718 discloses a closed oven containing burners located adjacent to the side wall of the oven. These burners produce a horizontally extending flame directed to the space underneath the food being cooked and a vertically oriented flame for heating the space above the food. The flames heat the air in the oven but are not used to heat a solid incandescent radiant body.

U.S. Pat. No. 3,667,449 discloses a home grill or barbecue having a tray containing pumice rocks. A central burner is provided that produces flames that extend radially outwards from the burner in a horizontal direction. A domed-shaped ceramic deflector overlying the burner deflects the flames from the burner onto the pumice rocks, which will be heated so that they are incandescent. The food is located above the bed of pumice rocks and is cooked by radiant heat emitted by the incandescent pumice rocks.

SUMMARY

Aspects of the invention are defined in the accompanying independent claims.

According to one aspect, a grill is configured to cook food placed above it, the grill comprising: a grill body having sidewalls and a base that together define a hollow interior. Gas jets (also known as "gas nozzles") are provided for burning gas and generating heat to cook food, the gas jets being located at the sides of the hollow interior and being directed downwardly and inwardly towards the interior.

The interior of the grill is configured to contain (and in use does contain) at least one radiant body at which the gas jets are directed and that is configured to redirect heat derived from the burning of gas by the gas jets in an upwardly direction. The term "radiant body" is used in the present specification to denote a body that, when the grill is operational, emits heat radiation in particular bodies that generate radiation because they are themselves hot.

In use, the radiant body absorbs heat energy from the burning gas, generally until it is incandescent, and it will then generate heat radiation that is directed upwardly towards the food (and generally in other directions as well). The radiant body may be a bed of particulate materials, e.g. mica or lava or ceramic stones, or it may be a single ceramic slab.

The radiant body may in addition reflect heat radiation from the gas flames upwards towards the food. Again, such a reflective radiant body may be a bed of particulate materials, or it may be a single slab or plate.

Of course both of the arrangements described above for directing heat upwards to the food may occur simultaneously, that is to say a radiant body may be heated by the radiation and so will generate heat radiation and will also, at the same time, reflect radiation.

The combustion of the gas will generate hot gases that will rise within the interior of the grill, thereby aiding the cooking.

The at least one radiant body may be inert, i.e. it is not consumed significantly by the flame from the gas jets, or it may include or be composed of consumable material, e.g. charcoal.

At least some of the gas jets will be located above the radiant bodies, although if the radiant body is in the form of a bed of heat absorbent material, e.g. lava stones, some of the gas jets may be located below the top of the bed, such an arrangement will generally not provide even heating across the area of the bed. The gas jets may be arranged around the top of the sidewalls of the grill, optionally in a staggered configuration with the gas jets being at different heights and/or pointing at different angles relative to the horizontal and/or at different angles relative to the vertical. Essentially the gas jets should be oriented to achieve as a uniform a cooking speed over the area of the grill as possible.

The grill may include supports that are capable of supporting skewers, a lattice, a spit and/or a griddle for holding the food being cooked. Such supports may be formed by the top of the sidewalls or may be separate mounts arranged on opposed sides of the grill. The gas jets may be directed at a downward angle of from 10° to 80°, relative to the horizontal, for example from 20° to 60°, such as 25° to 45°. They may be directed orthogonally across the interior or to one side or another. Different jets may be directed at different angles relative to the horizontal, optionally within the above range of angles.

The base may include a sump for collecting material, for example fats and meat juices, that fall down in the course of cooking and a tap may be provided for directing such liquids to a collection receptacle.

The gas jets have an elongated shape for producing fan-shaped flames.

The details of one or more embodiments of the invention are set forth in the accompanying drawings and the description below. Other features, objects and advantages of the invention will be apparent from the description and drawings, and from the claims.

Any feature in one aspect of the invention may be applied to other aspects of the invention, in any appropriate combination.

BRIEF DESCRIPTION OF DRAWINGS

Preferred features of the present invention will now be described, purely by way of example, with reference to the accompanying drawings, in which.

DETAILED DESCRIPTION

A broad aspect of the invention provides a grill having gas jets that are directed in an inward and downward direction towards the interior of the grill and the interior of the grill re-directs heat in an upwards direction towards the food. This has the advantage that the gas jets are less likely to become clogged with material falling from food being cooked. Also, the grill is easier to maintain and keep clean and avoids the problem of blocked gas jets producing an uneven heat supply for cooking food. The grill may be arranged so that even heat distribution across the grill interior is provided and allows the grill to get to cooking temperature may quickly.

Figure 1:
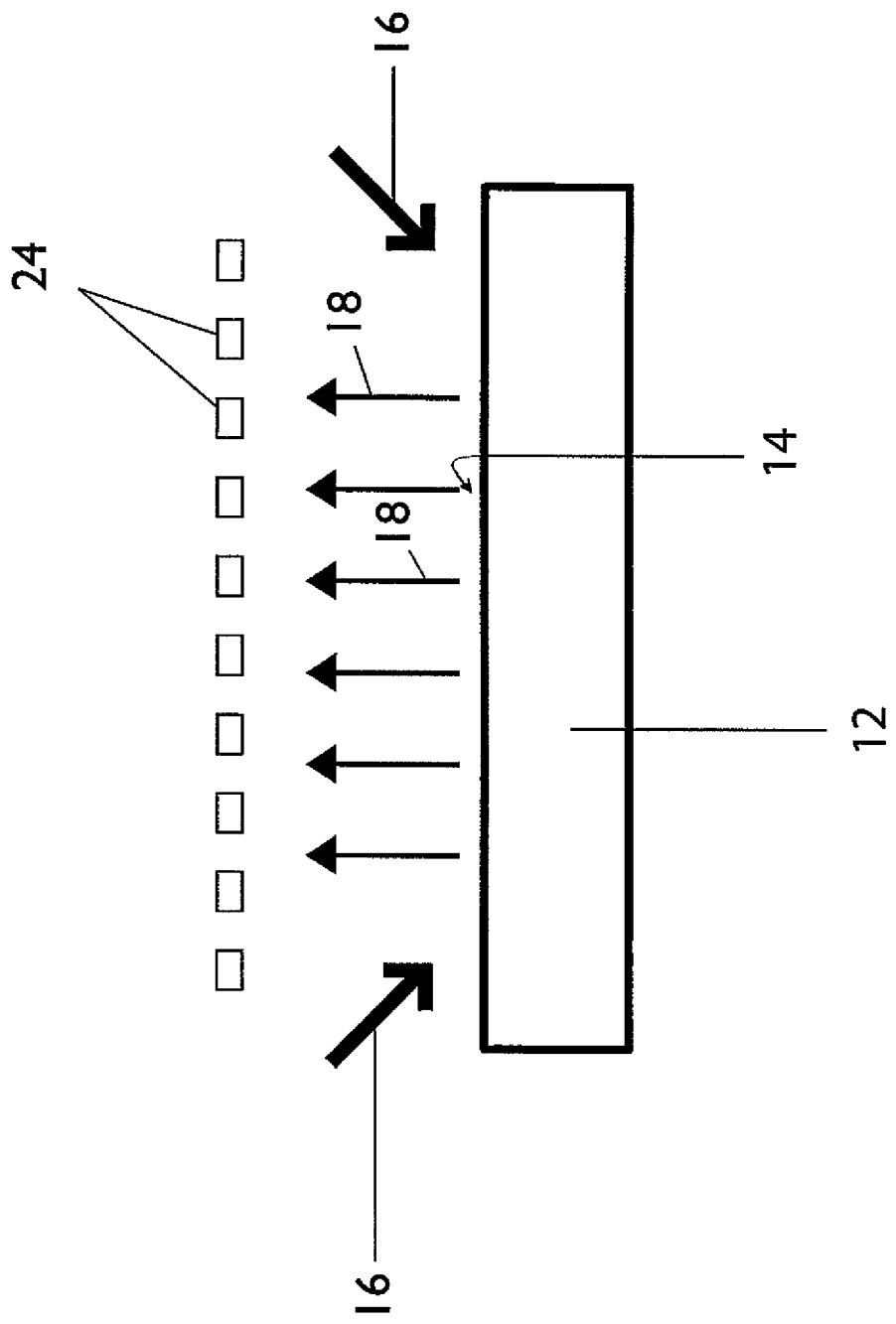
FIG. 1 shows a schematic diagram of heat flow.

FIG. 1 shows heat flow schematically within a grill 10. The grill has a base 12 and a support 24 for food being cooked. The base is hollow and includes an interior space (not shown in FIG. 1). Heat is generated by burning gas, e.g. propane, butane or mains gas, in gas jets (not shown but indicated schematically by arrow 16) spaced around the periphery of the interior space. The gas jets are directed in a downwards and inwards direction towards the interior space, according to arrows 16. The base 12 redirects the heat in an upward direction, according to arrows 18, as more fully described below. The food support 24 is located above the base 12 of the grill 10, thus heat from a heat source may be used for cooking food on the support 24. As is evident from FIG. 1, the grill is open topped and the food is cooked by heat generated below it.

The base 12 contains a heat-absorbent body for example a bed of heat-absorbent material 32 (see FIG. 3) to redirect heat upwards and provide an even heat distribution to the food. In FIG. 1, the gas jet is located at the sides of the base 12 and above the interior; the gas jets may be included in sidewalls surrounding the interior space, as shown in FIG. 3.

Figure 2:
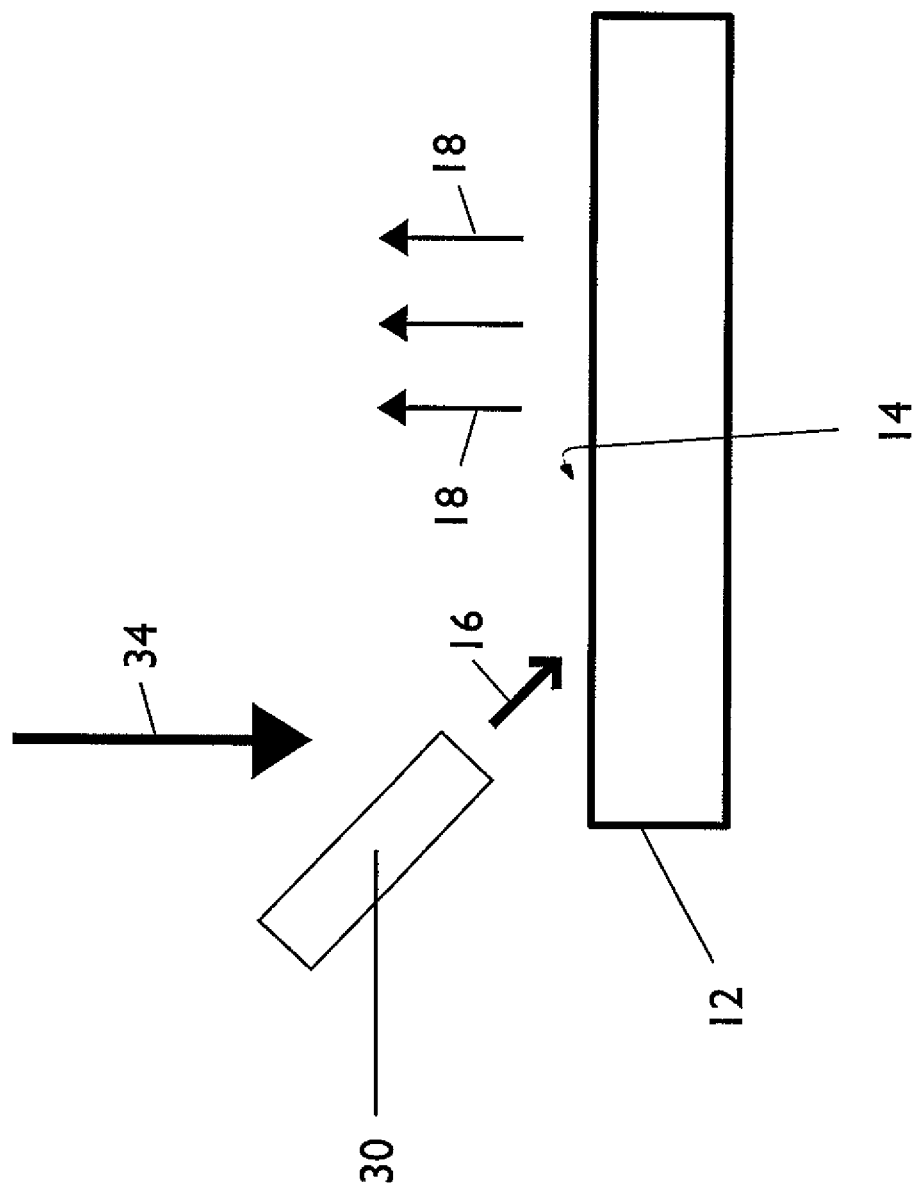
FIG. 2 shows a schematic diagram of a gas jet.

FIG. 2 is a schematic diagram of the orientation of a gas jet 30 used in a grill according to the present invention. Similarly to FIG. 1, heat produced by the gas jet 30 is directed in a downward and inward direction as shown by arrow 16 towards a heat-absorbent body or material held in the interior space of the base 12 and the interior of the base 12 redirects the heat in the direction of arrows 18 of FIGS. 1 and 2. During cooking, fats, meat juices and other material will be released from the food and will fall towards the base 12 in the direction of arrow 34 (FIG. 2). This material may fall onto the gas jets 30 or into the interior space. As the gas jet 30 is directed in a downwards direction 16, material falling onto the gas jet 30 in direction 34 does not fall directly on the opening of the gas jet and so is unlikely to clog it. Furthermore, the gas jets 30 are located to the side of the interior space and they will often not be directly below the food being cooked.

Figure 3:
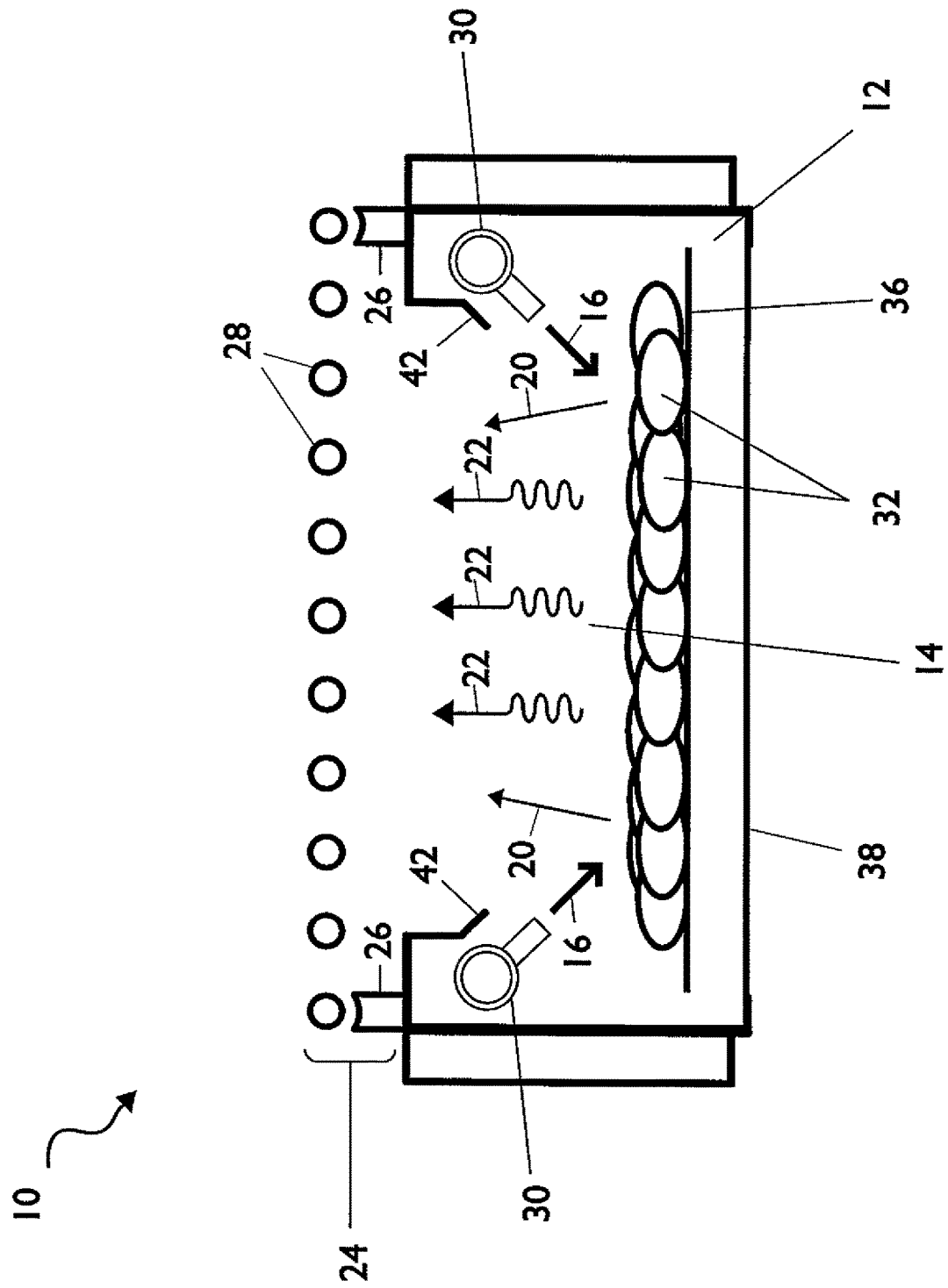
FIG. 3 shows a cross section of an embodiment of a grill.

The broad concept described above has been incorporated into a grill 10 shown schematically in FIG. 3. FIG. 3 shows a grill 10 which has a base 12 having an interior 14 and a support 24 for cooking food. Gas jets 30 are provided for burning gas and generating heat to cook the food. The gas jets 30 are directed in a downward and inwards direction, according to arrow 16, towards the interior 14 of the base 12.

Within the interior 14 of the base 12 a tray 36 is provided. The tray 36 contains a bed of heat absorbent inert material 32. This material 32 is heated by the gas jets 30 and then radiates heat upwardly in the direction 22 towards the support 24. The inert material may comprise particles or granules.

In addition to the bed of material 32, the interior 14 of the base may include a reflective body or reflective material configured to reflect radiation from the gas jets 30 upwards, according to arrow 20, to the food located above it. Thereby the food may be cooked by radiated heat 22 or both radiated heat 22 and reflected heat 20, originating from the gas jets 30 which were directed in a downward direction 16. Generally both radiated heat and reflected heat will be present but in different proportion depending on the nature of the radiant material provided within the interior 14. Rising hot gases from the flame will also play a role in the cooking. As is evident from FIGS. 2 and 3, the grill is open topped and the food is cooked by heat generated below it.

The grill 10 generally will be provided with more than one gas jet 30 and any number of gas jets 30 may be provided. These will be arranged above the radiant material 32 and around the interior 14 of the base 12, e.g. they may be supported by or incorporated into the side walls defining the interior space 14. The arrangement of the gas jets 30 is preferably such that the inert material 32 is heated evenly. This provides an even heat distribution directed towards the cooking food. The gas jets 30 may be directed at an angle from 10°-80°, relative to the horizontal, towards the base interior 14 in direction 16. More particularly, the gas jets 30 may be angled, for example, in a range from 20°-60°, such as 25°-45°. The gas jets 30 may be all at the same angle, or they may be staggered, to better distribute the heat across the material 32. It is not essential that the gas jets 30 are evenly spaced around the interior of the base 14 and the exact arrangement of the gas jets 30 will depend on the size and shape of the grill 10.

The gas jets 30 may have a gas outlet nozzle with an elongated shape for producing fan shaped flames in order to distribute the heat over the interior of the base 14 better.

In FIG. 3, the food support 24 is shown located above the interior 14 of the base 12. The support 24 comprises mounts 26 and a lattice 28, which extends across the whole of the interior space 14, can then be supported on the mounts 26 to hold food during cooking. Fats and meat juices and other material may fall down into the interior 14. The material will collect in the bottom 38 of the base 12, which acts as a sump. The grill may further include a channel for directing material from the bottom 38 into a receptacle (not shown).

The grill may further provide (see FIG. 3) a shield 42 above the gas jets 30 to deflect material falling from cooking food away from the gas jets 30.

The grill may be fabricated from any suitable materials. Further a grill according to the claimed concept may be made by modifying a known grill. Suitable materials will be well known to the person skilled in the art. For example, the base may be made from sheet stainless steel that has been folded or otherwise manipulated into a suitable configuration. In particular the interior of the base may be a reflective material.

The gas jets may be commercially available gas jets or they may be specifically designed. The grill comprises means for controlling the gas jets so that cooking may be regulated by the user.

The bed 32 may be formed from mica or lava stones or other such materials. Alternatively, consumable materials which improves the flavour of the food, such as herbs, aromatic wood chips or charcoal may form the bed 32 on the tray 36 instead of or in addition to the inert material.

The term "grill" means that food is cooked one side at a time and, in the case of the present invention (as is evident from FIGS. 1 to 3,), almost exclusively by heat energy rising from below the food. It is implied in the word "grill" that the food is not baked, i.e. held within an enclosed environment such as an oven during cooking but rather in an open environment; also, as is evident from FIGS. 1 to 3, the grill according to the present invention has an open top.

Some parts of the grill may also have a coating, such as Teflon™, to further assist in keeping the grill clean and directing material away from the gas jets.

The gas jet grill has been described which is suitable for use in domestic or commercial applications. The grill may be provided with additional features which will be known to the skilled person.

It will be understood that the present invention has been described above purely by way of example, and modification of detail can be made within the scope of the invention.

The invention claimed is:

1. An apparatus for cooking food comprising:
a plurality of sidewalls;
a food support mounted to at least one of the sidewalls;
at least one body positioned between the sidewalls below the food support; and
gas jets located along at least one of the sidewalls between the food support and the at least one body, the gas jets for burning gas and generating heat to cook food arranged above the gas jets on the food support, the gas jets each comprise a gas outlet nozzle that increases a velocity of the gas burned by the gas jets, the gas jets extend inwardly and downwardly from the sidewalls in the direction of the at least one body to direct flames from the gas jets at the at least one body;
wherein heat is directed upwardly from the at least one body towards the food arranged on the food support to cook the food arranged on the food support by heat from the at least one body, and the at least one body is at least one reflective body and the reflective body directs heat upwards towards the food by reflection to cook the food by reflected heat.

2. An apparatus for cooking food comprising:
a plurality of sidewalls;
a food support mounted to at least one of the sidewalls;
at least one body positioned between the sidewalls below the food support; and
gas jets located along at least one of the sidewalls between the food support and the at least one body, the gas jets for burning gas and generating heat to cook food arranged above the gas jets on the food support, the gas jets each comprise a gas outlet nozzle that increases a velocity of the gas burned by the gas jets, the gas jets extend inwardly and downwardly from the sidewalls in the direction of the at least one body to direct flames from the gas jets at the at least one body;
wherein heat is directed upwardly from the at least one body towards the food arranged on the food support to cook the food arranged on the food support by heat from the at least one body, and the at least one body is at least one radiant body that directs heat upwards towards the food by radiation to cook the food by radiated heat.

3. The apparatus of claim 2, wherein the at least one radiant body is charcoal.

4. The apparatus of claim 2, wherein the at least one radiant body comprises a heat absorbent material that absorbs heat from the burning gas and radiates the absorbed heat in an upward direction towards the food arranged on the food support to cook the food arranged on the food support by heat radiated by the at least one radiant body.

5. The apparatus of claim 4, wherein the heat generated by burning gas of the gas jets is reflected upwards by the at least one radiant body towards the food arranged on the food support to cook the food arranged on the food support by heat radiated and reflected by the at least one radiant body.

6. An apparatus for cooking food comprising:
a plurality of sidewalls;
a food support mounted to at least one of the sidewalls;
at least one body positioned between the sidewalls below the food support; and
gas jets located along at least one of the sidewalls between the food support and the at least one body, the gas jets for burning gas and generating heat to cook food arranged above the gas jets on the food support, the gas jets each comprise a gas outlet nozzle that increases a velocity of the gas burned by the gas jets, the gas jets extend inwardly and downwardly from the sidewalls in the direction of the at least one body to direct flames from the gas jets at the at least one body;

wherein heat is directed upwardly from the at least one body towards the food arranged on the food support to cook the food arranged on the food support by heat from the at least one body, and wherein the food support is a skewer, a lattice, a spit, and/or a griddle for holding food to be cooked.

7. An apparatus for cooking food comprising:
a plurality of sidewalls;
a food support mounted to at least one of the sidewalls;
at least one body positioned between the sidewalls below the food support; and
gas jets located along at least one of the sidewalls between the food support and the at least one body, the gas jets for burning gas and generating heat to cook food arranged above the gas jets on the food support, the gas jets each comprise a gas outlet nozzle that increases a velocity of the gas burned by the gas jets, the gas jets extend inwardly and downwardly from the sidewalls in the direction of the at least one body to direct flames from the gas jets at the at least one body;
wherein heat is directed upwardly from the at least one body towards the food arranged on the food support to cook the food arranged on the food support by heat from the at least one body, and wherein the gas outlet nozzles of the gas jets have an elongated shape that extends inwardly and downwardly from the sidewalls.

8. An apparatus for cooking food comprising:
a plurality of sidewalls;
a food support mounted to at least one of the sidewalls;
at least one body positioned between the sidewalls below the food support; and
gas jets located along at least one of the sidewalls between the food support and the at least one body, the gas jets for burning gas and generating heat to cook food arranged above the gas jets on the food support, the gas jets each comprise a gas outlet nozzle that increases a velocity of the gas burned by the gas jets, the gas jets extend inwardly and downwardly from the sidewalls in the direction of the at least one body to direct flames from the gas jets at the at least one body;
wherein heat is directed upwardly from the at least one body towards the food arranged on the food support to cook the food arranged on the food support by heat from the at least one body, and wherein the gas jets extend downwardly and inwardly at an angle of from 10° to 80° relative to the horizontal.

9. The apparatus of claim 5, wherein individual gas jets of the gas jets extend downwardly and inwardly at different angles between 10° to 80° relative to the horizontal.

10. An apparatus for cooking food comprising:
a plurality of sidewalls;
a food support mounted to at least one of the sidewalls;
at least one body positioned between the sidewalls below the food support; and
gas jets located along at least one of the sidewalls between the food support and the at least one body, the gas jets for burning gas and generating heat to cook food arranged above the gas jets on the food support, the gas jets each comprise a gas outlet nozzle that increases a velocity of the gas burned by the gas jets, the gas jets extend inwardly and downwardly from the sidewalls in the direction of the at least one body to direct flames from the gas jets at the at least one body;
wherein heat is directed upwardly from the at least one body towards the food arranged on the food support to cook the food arranged on the food support by heat from the at least one body, and further comprising shields positioned between the gas jets and the food support.

11. A method of cooking food, the method comprising:
providing a food support mounted to at least one sidewall of a plurality of sidewalls, at least one body positioned between the sidewalls below the food support, and gas jets located along at least one sidewall of the plurality of sidewalls between the food support and the at least one body, the gas jets extend inwardly and downwardly towards the at least one body;
burning gas from the gas jets to generate flames and heat;
directing the flames from the gas jets at the at least one body;
directing heat upwardly from the at least one body towards the food arranged on the food support; and
cooking food arranged on the food support above the at least one body with the heat directed upwardly by the at least one body;
wherein the at least one body is at least one reflective body and further comprising reflecting the heat generated by burning the gas from the gas jets upwards from the at least one reflective body.

12. A method of cooking food, the method comprising:
providing a food support mounted to at least one sidewall of a plurality of sidewalls, at least one body positioned between the sidewalls below the food support, and gas jets located along at least one sidewall of the plurality of sidewalls between the food support and the at least one body, the gas jets extend inwardly and downwardly towards the at least one body;
burning gas from the gas jets to generate flames and heat;
directing the flames from the gas jets at the at least one body;
directing heat upwardly from the at least one body towards the food arranged on the food support; and
cooking food arranged on the food support above the at least one body with the heat directed upwardly by the at least one body;
wherein the at least one body is at least one radiant body and further comprising radiating heat from the at least one radiant body upwards towards the food arranged on the food support.

13. The method of claim 12, further comprising:
absorbing heat from the flames of the gas jets with the at least one radiant body;
radiating the absorbed heat from the at least one radiant body; and
reflecting heat generated by burning the gas from the gas jets upwards from the at least one radiant body;
wherein cooking food arranged on the food support is done with the heat radiated by the at least one radiant body and the heat reflected by the at least one radiant body.

14. The method of claim 12, wherein the at least one radiant body comprises charcoal.

15. The method of claim 12, wherein the at least one radiant body comprises a heat absorbent inert material and further comprising:
placing consumable materials on the bed of heat absorbent inert material; and
consuming the materials with the heat from the flames and the at least one radiant body to impart flavor to the food arranged on the food support.

16. A method of cooking food, the method comprising:
providing a food support mounted to at least one sidewall of a plurality of sidewalls, at least one body positioned between the sidewalls below the food support, and gas jets located along at least one sidewall of the plurality of sidewalls between the food support and the at least one body, the gas jets extend inwardly and downwardly towards the at least one body;
burning gas from the gas jets to generate flames and heat;
directing the flames from the gas jets at the at least one body;
directing heat upwardly from the at least one body towards the food arranged on the food support;
cooking food arranged on the food support above the at least one body with the heat directed upwardly by the at least one body; and
further comprising increasing the velocity of the gas burned by the gas jets with gas outlet nozzles.

17. The method of claim 16, wherein the gas outlet nozzles are elongated in shape and extend inwardly and downwardly from the sidewalls.

18. A method of cooking food, the method comprising:
providing a food support mounted to at least one sidewall of a plurality of sidewalls, at least one body positioned between the sidewalls below the food support, and gas jets located along at least one sidewall of the plurality of sidewalls between the food support and the at least one body, the gas jets extend inwardly and downwardly towards the at least one body;
burning gas from the gas jets to generate flames and heat;
directing the flames from the gas jets at the at least one body;
directing heat upwardly from the at least one body towards the food arranged on the food support; and
cooking food arranged on the food support above the at least one body with the heat directed upwardly by the at least one body;
wherein the gas jets extend downwardly and inwardly at an angle of from 10° to 80° relative to the horizontal.

* * * * *